United States Patent Office 3,216,828
Patented Nov. 9, 1965

1

3,216,828
REMOVING SHELLS FROM COOKED EGGS
Carl H. Koonz, Downers Grove, and Eldon J. Strandine, Chicago, Ill., assignors to Swift & Company, Chicago, Ill., a corporation of Illinois
No Drawing. Filed Feb. 1, 1963, Ser. No. 255,660
25 Claims. (Cl. 99—113)

This invention relates to methods of preparing shell-less hard-cooked eggs. More particularly, it relates to methods for artificially aging, cooking, shelling and/or packaging hard-cooked eggs.

Egg consumption has declined in recent years. In 1945 the civilian per capita consumption of eggs was 402; whereas by 1959 the per capita consumption had been reduced to 347. Hard-cooked eggs have always been a favorite product with consumers, hotels, restaurants and institutions. Such eggs are consumed per se, or they may be served as deviled eggs, or they may be sliced for use in salads, or they may be grated, just to mention a few of the uses. Homemakers, hotels, restaurants and institutions often find it inconvenient to boil eggs and to remove the shells from such eggs. In fact, it is becoming increasingly difficult to remove the shells from eggs. There are two primary reasons for this. Eggs are being placed in the hands of the users in a fresher condition than in former years. It is well known that it is more difficult to peel the shell off fresh eggs than eggs held for a long period of time or stale eggs. A second factor that makes shell removal difficult is the recent practice introduced in the industry of coating or oiling eggs on the farm. The oil or coating inhibits the loss of moisture through the shell and thus will not permit egg membranes or materials to shrink away from the shell. Also, the oil slows down the loss of gases through the shell and in this way retards aging of the egg. Eggs sprayed or otherwise oil treated promptly after being laid will remain fresh for a longer period of time.

One way to increase the use and consumption of hard-cooked eggs is to make available to consumers such eggs with the shells removed. This would then become a product with built-in convenience.

It is therefore an object of this invention to describe a method for the rapid and economical and practical removal of shells from hard-cooked eggs.

In addition to the shell, eggs have two membranes; the outer membrane is closely affixed to the shell, and the inner membrane which adjoins the white of the egg. In fresh eggs, these two membranes are not readily separated from one another, nor are they readily separated from the shell or the egg white. In freshly laid eggs, the inner shell membrane adheres closely to the cooked or coagulated albumen. This results because the egg meat is still relatively acid. As carbon dioxide escapes from the egg, the acidity level is reduced. It is easy to observe that the physical characteristics of the egg white changes during aging. In aged eggs, the cooked white appears to be more firm whereas the cooked white of a fresh egg appears to be soft and very fragile.

Therefore, it is an object of the instant invention to produce artificial methods of aging fresh eggs in order to facilitate the easy removal of the shells from the fresh hard-cooked eggs.

Another object of the instant invention is to provide a continuous process for producing shell-less hard-cooked eggs on a commercial scale from any eggs, regardless of age.

Other and further objects will become apparent from reading the following detailed description.

Generally, this invention comprehends methods for

2 artificially aging eggs and the preparation of shell-less hard-cooked eggs. These methods may relate to a continuous process including any of the following steps:

(1) Removal of artificial coatings (e.g. oil) from egg shells.
(2) Artificially aging shell eggs.
(3) Hard-cooking the eggs.
(4) Chilling the eggs partially or completely.
(5) Crushing and segmenting egg shells.
(6) Removal of egg shells.
(7) Washing shelled eggs.
(8) Pasteurizing the egg's surface.
(9) Wrapping or coating individual eggs.
(10) Weighing and packaging.

More particularly, our invention relates to methods for artificially conditioning eggs in order to make the removal of the shells easier and to make the use of a continuous process for preparing shelled eggs practical. Eggs which are held under normal storage conditions for about six days or more do not require artificial aging but can be cooked and shelled by the method disclosed herein using compressed air for the shelling operation. The aging process in eggs is caused by the raising of the pH which may be effected by the escape of carbon dioxide through the egg shells.

Thus, anything reducing the escape of gas from the egg shells will decelerate the aging process. Today it is a common practice to treat or coat fresh eggs with oils or other impervious films which seal the pores. Therefore, these oils or coatings should first be removed before proceeding to artificially age the eggs.

Generally, hard-cooking of the eggs is done by placing them in boiling water. There is a large variation in cooking time, depending on the temperature of the water and of the eggs when they are immersed; however, boiling them for about ten minutes is generally sufficient.

Promptly after removing the eggs from the cooking bath, they may be partially or totally chilled. Subsequent keeping qualities of the eggs makes it desirable to promptly chill the eggs to about 40° F. or lower. Inadequately chilled eggs will show early deterioration. The method of chilling employed depends on the extent to which the eggs are to be chilled, such as spraying them with cold water or running them through a liquid bath which has a temperature adequate to lower the egg temperature rapidly.

Egg shells may be broken or segmented by numerous means. The eggs may be placed in a shaking machine such as a Novo shaker which causes the eggs to be jarred about in such a way that the shells are broken and separated. A second means is to conduct the shell eggs between two belts or a series of rollers that approximate one another closely enough so as to break or segment the shells. Another means for removing egg shells is by segmenting, breaking, or crushing and subsequently hitting the shell with a jet or stream of air. The jet or stream of air must penetrate the inner and outer shell membranes lying immediately beneath the shell and care must be taken during the breaking or crushing of the shell to avoid the breaking of the coagulated egg or protein area adjacent to the inside of the egg shell. Once the shell membranes have been penetrated, the air will follow the surface contour of the egg or the area lying between the inner shell membrane and the coagulated protein and literally explode or remove the shell and the shell membranes from the conventionally edible parts of the egg. A simple way to demonstrate this process is to take a hard-cooked egg and gently tap it against a firm object to break or segment the shell. Following this, the egg is rolled gently between the palms of the hands. The egg is then exposed to a sharp jet of air at which time the shell and outer membranes are blown or caused to be separated from the intact egg white. In this process, neither the white nor the yolk need be broken or otherwise injured. Other means for removing the shell from the egg will be obvious to one skilled in the art, such as by brushes or by washing the shell off with a stream or spray of water.

An additional means of segmenting the egg shells is to position the individual eggs so that they are handled by one or more suction cups; for an example, one at each end of the shell. The shell is then caused to be crushed by being conducted between belts, beaters, or rollers or otherwise caused to be broken.

In blowing the egg shell off the egg, the jet of air need not be directed to any particular area of the egg. It is only necessary that the air penetrate the membranes at which instant the shell, including the membranes, are lifted by force of the air off the coagulated egg meat. Eggs with broken or crushed shells may be placed on wire, with the strands of wire being sufficiently far apart so that they just hold the eggs. The air jets were then directly on the eggs and the shells were blown off the eggs and on a shell disposal unit beneath the eggs.

After the egg shells have been removed, the eggs may be washed by any suitable means, such as in a water bath or water spray, etc.

A number of factors would determine whether peeled eggs need to be pasteurized. One factor would be the length of time that the eggs must remain edible. If the eggs were to be consumed on the day or the day following processing, pasteurization would not be urgent. However, if eggs were to be put through the conventional trade channels, then pasteurizatioin would be necessary. The surface of the shelled eggs may be pasteurized with steam or by means of hot liquid.

After the shelled eggs have been washed and/or pasteurized, they may be packaged individually or placed in cartons. This may be accomplished by automatically placing the eggs in a bag-type container such as those made of plastic films and subsequently vacuumizing the bag and sealing it. The bag or other container may be back-filled with inert gases prior to sealing. Also, the shelled eggs may be packed in any suitable egg carton-type container which can subsequently be mechanically sealed and placed in suitable shipping containers.

It has been discovered that many of the problems encountered in removing the shell from fresh eggs can be overcome by artificially aging the eggs prior to removing their shells. A correlation has been found to exist between the pH of the albumen of eggs and the ease with which the shells may be easily removed after boiling. Eggs were tested with a pH of the albumen ranging from fresh eggs with a pH of about 8.9 to artificially aged eggs with a pH ranging up to 9.8. Eggs whose pH ranges from about 9.1 to about 9.8 can be easily shelled after cooking. However, best results are obtained from eggs whose pH ranges from about 9.3 to about 9.5. The aging process of eggs is the result of carbon dioxide being given off through the membranes and shell of the egg. The loss of carbon dioxide from eggs can be reduced by subjecting the shell of fresh eggs to an artificial coating such as an oil. Such artificial films or coatings must be removed prior to the artificial aging process. It has also been found that the coagulation of the egg albumen delays the loss of carbon dioxide. Accordingly, it is preferable that the eggs first be subjected to the artificial aging process prior to being cooked.

One method for artificially accelerating the loss of carbon dioxide from eggs is to vary the time and temperature. As carbon dioxide escapes through the egg shell, the corresponding increase of the pH of the albumen results. The ease with which the shell is removed increases as the pH of the albumen is raised. These relationships are set forth in the following table.

TABLE I

*Effect of time and temperature on the albumen of eggs and the resulting ease of removing the shells (all eggs 2–4 hours old at the start)*

| Temperature held, °F. | Time (days) | pH of albumen Range | pH of albumen Avg. | Percent of eggs peeling readily |
|---|---|---|---|---|
| 32–34 | 2 | 8.88–9.10 | 8.93 | 33.3 |
| 32–34 | 3 | 9.00–9.10 | 9.03 | 33.3 |
| 32–34 | 6 | 9.28–9.40 | 9.35 | 100.0 |
| 50 | 2 | 9.00–9.15 | 9.07 | 50.0 |
| 50 | 3 | 9.00–9.30 | 9.22 | 66.6 |
| 50 | 5 | 9.10–9.40 | 9.28 | 66.6 |
| 50 | 6 | 9.35–9.45 | 9.38 | 100.0 |
| 75 | 2 | 9.20–9.32 | 9.25 | 66.6 |
| 75 | 3 | 9.30–9.50 | 9.41 | 100.0 |
| 75 | 6 | 9.50–9.70 | 9.63 | 100.0 |
| 100 | 2 | 9.15–9.35 | 9.27 | 100.0 |
| 100 | 3 | 9.28–9.45 | 9.41 | 100.0 |
| 100 | 5 | 9.50–9.60 | 9.57 | 100.0 |
| 120 | 2 | 9.35–9.45 | 9.41 | 100.0 |
| 120 | 3 | 9.45–9.65 | 9.54 | 100.0 |
| 120 | 5 | 9.50–9.60 | 9.54 | 100.0 |

When the pH is raised above about 9.1, mechanical means can be used to crush and remove the shells. Eggs held at 100–120° F. for one day will have a pH sufficiently high (above about 9.1) so that the eggs can be shelled satisfactorily. Eggs held at room temperature should be at least three days old, while those held at refrigerated temperatures must be five to six days old.

The aging of eggs may be accelerated by the treatment of the eggs with chemicals, e.g., carbon dioxide absorbers. Eggs treated within one hour of being laid were found to have a pH ranging from about 7.50. A portion of these eggs was exposed to ammonia fumes for a period of as little as about 15 minutes, during which time the pH of the egg albumen had been elevated to above 9.1 and the shells were readily removable. Longer exposure times raised the pH even higher but excessively long exposure times may result in the introduction of undesirable ammonia odors which must be removed by aeration. Removing the carbon dioxide from the air around the egg increases the removal of the carbon dioxide through the egg shell. Another portion of these eggs was held over soda lime in a closed container. Soda lime is a mixture of sodium hydroxide and calcium hydroxide. This material, in the presence of carbon dioxide, forms calcium carbonate, according to the following equation:

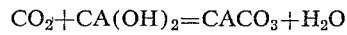
$$CO_2 + CA(OH)_2 = CACO_3 + H_2O$$

Also, the sodium hydroxide or the calcium hydroxide can independently absorb carbon dioxide according to the following equation:

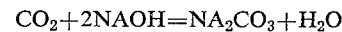
$$CO_2 + 2NAOH = NA_2CO_3 + H_2O$$

It is obvious that other carbon dioxide absorbers may be used effectively such as barium hydroxide.

It was found that treating eggs with carbon dioxide absorbers while being held at artificially elevated temperatures further accelerated the rate with which the carbon dioxide is lost through the egg shell.

Obviously, many modifications and variations of the invention as hereinbefore set forth may be made without departing from the spirit and scope thereof, and therefore, only such limitations should be imposed as are indicated in the appended claims.

We claim:

1. A method of producing shell-less whole hard-cooked eggs by artificially raising the albumen pH comprising: contacting whole eggs having an albumen pH below 9.1 with chemical carbon dioxide absorbers for a time sufficient to raise the pH of the egg albumen above about 9.1; hard-cooking the eggs; and, segmenting and removing the egg shells.

2. A method as provided in claim 1 in which the carbon dioxide absorber is calcium hydroxide.

3. A method as provided in claim 1 in which the carbon dioxide absorber is soda lime.

4. A method as provided in claim 1 in which the carbon dioxide absorber is barium hydroxide.

5. A method as provided in claim 1 in which the carbon dioxide absorber is sodium hydroxide.

6. A method as provided in claim 1 in which the carbon dioxide absorber is gaseous ammonia.

7. A method as provided in claim 1 in which the carbon dioxide absorber is ammonium hydroxide.

8. A method of producing shell-less whole hard-cooked eggs by artificially raising the albumen pH comprising: artificially heating whole eggs having an albumen pH below 9.1 from about 100 to about 120° F. for a period sufficient to raise the pH of the egg albumen above about 9.1; hard-cooking the eggs; and, segmenting and removing the egg shells.

9. A method of producing shell-less whole hard-cooked eggs by artificially raising the albumen pH comprising: artificially heating whole eggs having an albumen pH below 9.1 to about 100° F. for about 24 hours whereby the albumen pH is raised to at least about 9.1; hard-cooking the eggs; and segmenting and removing the egg shells.

10. A method of producing shell-less whole hard-cooked eggs by artificially raising the albumen pH comprising: artificially heating whole eggs having an albumen pH below 9.1 from above 100 to about 120° F. for a period sufficient to raise the pH of the egg albumen above about 9.1; hard-cooking the eggs; and segmenting the egg shells and membranes and blowing with compressed air, whereby the egg shells are removed.

11. A method of producing shell-less whole hard-cooked eggs by artificially raising the albumen pH comprising: artificially heating whole eggs having an albumen pH below 9.1 to about 100° F. for about 24 hours whereby the albumen pH is raised to at least about 9.1; cooking the eggs; and piercing mechanically and removing the egg shells with compressed air.

12. A method of producing shell-less whole hard-cooked eggs comprising: contacting the eggs with calcium hydroxide for a time sufficient to raise the pH of the egg albumen to at least about 9.1; hard-cooking the eggs; and piercing mechanically the egg shells and removing with compressed air.

13. A method of producing shell-less whole hard-cooked eggs comprising: contacting the eggs with soda lime for a time sufficient to raise the pH of the egg albumen to at least about 9.1; hard-cooking the eggs; and piercing mechanically the egg shells and removing with compressed air.

14. A method of producing shell-less whole hard-cooked eggs comprising: contacting the eggs with barium hydroxide for a time sufficient to raise the pH of the egg albumen to at least about 9.1; hard-cooking the eggs; and piercing mechanically the egg shells and removing with compressed air.

15. A method of producing shell-less whole hard-cooked eggs comprising: contacting the eggs with sodium hydroxide for a time sufficient to raise the pH of the egg albumen to at least about 9.1; hard-cooking the eggs; and piercing mechanically the egg shells and removing with compressed air.

16. A commercial method for producing shell-less whole hard-cooked eggs by artificially accelerating the loss of carbon dioxide from the egg shells comprising the following steps: cleaning the eggs; contacting the eggs with chemical dioxide absorbers for a time sufficient to raise the pH of the egg albumen to at least about 9.1; hard-cooking the eggs; chilling the eggs to at least 40° F.; segmenting and removing the egg shells; pasteurizing the eggs; and packaging and sealing the eggs under vacuum.

17. A method in accordance with claim 16 in which the carbon dioxide absorber is selected from the group consisting of soda lime, barium hydroxide, calcium hydroxide, sodium hydroxide, gaseous ammonia, ammonium hydroxide, and mixtures thereof.

18. In the method of claim 16 wherein the vacuum package is first back-filled with inert gas prior to sealing.

19. A method of producing shell-less whole hard-cooked eggs by artificially raising the albumen pH comprising: artificially accelerating the loss of carbon dioxide from whole eggs having an albumen pH below 9.1 by at least one of the steps of (a) artificially heating the whole eggs to a temperature from about 100° F. to about 120° F. and (b) by directly contacting the egg shells with carbon dioxide absorbers for a time sufficient to raise the albumen pH to at least about 9.1; thereafter hard-cooking the eggs; and segmenting and removing the egg shells.

20. A method of producing shell-less hard-cooked eggs comprising: contacting the eggs with gaseous ammonia for a time sufficient to raise the pH of egg albumen to at least about 9.1, hard-cooking the eggs; and segmenting and removing the eggs shells.

21. A method of producing shell-less hard-cooked eggs comprising: contacting the eggs with ammonium hydroxide for a time sufficient to raise the pH of egg albumen to at least about 9.1; hard-cooking the eggs; and segmenting and removing the eggs shells.

22. A method of producing shell-less whole hard-cooked eggs by artificially raising the pH of egg albumen comprising: contacting whole eggs having an albumen pH below 9.1 with carbon dioxide absorbers selected from the group consisting of soda lime, barium hydroxide, calcium hydroxide, sodium hydroxide, gaseous ammonia, ammonium hydroxide and mixtures thereof for a period sufficient to raise the albumen pH to at least about 9.1; hard-cooking the eggs; and segmenting and removing the egg shells.

23. A method as provided in claim 22 wherein the eggs are cleaned prior to contacting with carbon dioxide absorbers.

24. A method as provided in claim 22 wherein the egg shells and membranes are mechanically pierced and the broken shells are removed by compressed air.

25. A method as provided in claim 22 wherein the outer surfaces of the segmented egg shells are exposed to a jet of air thereby removing the broken shells.

References Cited by the Examiner

UNITED STATES PATENTS 2,575,608   11/51   Williams _____ 99—355

A. LOUIS MONACELL, *Primary Examiner.*

WILLIAM B. KNIGHT, *Examiner.*